US005991480A

United States Patent [19]
Kunz et al.

[11] Patent Number: 5,991,480
[45] Date of Patent: Nov. 23, 1999

[54] PROCESS AND DEVICE FOR MEASURING LIGHT BEAMS

[75] Inventors: Rino Kunz, Steinmaur; Jürg Duebendorfer, Zurich, both of Switzerland

[73] Assignee: Paul Scherrer Institut, Villigen, Switzerland

[21] Appl. No.: 08/817,993

[22] PCT Filed: Aug. 7, 1996

[86] PCT No.: PCT/CH96/00275

§ 371 Date: Jun. 23, 1997

§ 102(e) Date: Jun. 23, 1997

[87] PCT Pub. No.: WO97/09594

PCT Pub. Date: Mar. 18, 1997

[30] Foreign Application Priority Data

Sep. 1, 1995 [CH] Switzerland ............................ 2496/95

[51] Int. Cl.⁶ .................................................. G02B 6/34
[52] U.S. Cl. .............................. 385/37; 385/131; 385/45; 385/147
[58] Field of Search ...................... 372/96, 102; 385/147, 385/12, 37, 10, 129, 130, 131, 45

[56] References Cited

U.S. PATENT DOCUMENTS 4,803,696  2/1989  Pepper et al. ............................ 372/102
5,103,456  4/1992  Scifres et al. ............................ 372/102
5,418,802  5/1995  Chwalck .................................. 372/102

OTHER PUBLICATIONS

"High Precision Molding Of Integrated Optical Structures", L. Baraldi et al., Paul Scherrer Institute Zurich, SPIE vol. 1, 1992 Miniature and Micro–Optics and Micromechanics (1993) pp. 21–29.

"Miniature Integrated–Optical Wavelength Analyzer Chip", R.E. Kunz et al., Paul Scherrer Institute Zurich, 2412 Optics Letters, vol. 20, No. 22, Nov. 15, 1995, pp. 2300–2302.

"Gradient Effective Index Waveguide Sensors", R.E. Kunz, Paul Scherrer Institute Zurich, Sensors and Actuators B, 11 (1993) pp. 167–176.

"Laser–Spektroskopie", Wolfgang Demtröder, Grundlagen und Techniken, Aug. 17, 1994, pp. 189–191.

Primary Examiner—Hung N. Ngo
Attorney, Agent, or Firm—Burns, Doane, Swecker & Mathis, L.L.P.

[57] ABSTRACT

A light beam (6) is applied to a waveguide (3) in order to measure properties of the beam (6), e.g. the wavelength. According to the invention, the waveguide (3) has locally and/or time-varying resonances, e.g. by suitably designed grid couplers (4, 5). A light signal (7) is thus generated in the waveguide (3) as a direct measurement of the property to be measured and can be further processed by suitable means or evaluated. It is thus possible, for example, advantageously to produce a simple and inexpensive spectrometer.

26 Claims, 6 Drawing Sheets

PROCESS AND DEVICE FOR MEASURING LIGHT BEAMS

BACKGROUND

The instant invention relates to a process as well as means for executing the process for determining a property of an optical light beam.

A number of optical sensors for determining the values of one or several quantities to be measured are known.

Spectrometers, which spread the light beams out, for example by means of prisms or gratings, are known in particular for measuring light beams.

Measurement with conventional spectrometers has the disadvantage that as a rule it is an elaborate process and must be performed with expensive apparatus. Furthermore, this is a measurement which is not free of destruction, i.e. the light beam is practically destroyed for and during measuring. No measurement of an operating light beam can be performed with it or the operation must be interrupted for the measurement, or a portion of the beam must be separated by means of a co-called beam splitter and imaged on a small inlet opening.

The object of the instant invention was to find a process for measuring the quantity of a light beam which in particular permits at least a low-destructive measurement simply and with a few technical means.

This object is attained in accordance with the invention as will be described in the following.

The measuring process in accordance with the invention has, on the one hand, the great advantage that only a small fraction of the light beam is used for the measurement, i.e. only a small loss in intensity occurs. With this it is possible to also measure a light beam which is being operated without a noticeable loss of intensity occurring, i.e. measurement can be performed during operation. Furthermore, the measurement can take place by very simple and cost-effective means. It is also possible in the simplest way to select the quantity to be measured or parameter as desired. For example, the process can be performed for determining the wavelength or the angle of incidence of the light beam on the measuring device. This is simply achieved in that all parameters are kept constant, except for the quantity to be measured.

The process in accordance with the invention is particularly suited for realizing a compact miniaturized wavelength measuring device with a high degree of resolution. Measuring devices of this type can be used for measuring or monitoring light sources, such as laser light sources, for example.

Exemplary embodiments of the invention will be explained in more detail below by means of the drawings, in which:

DETAILED DESCRIPTION

Figure 1:
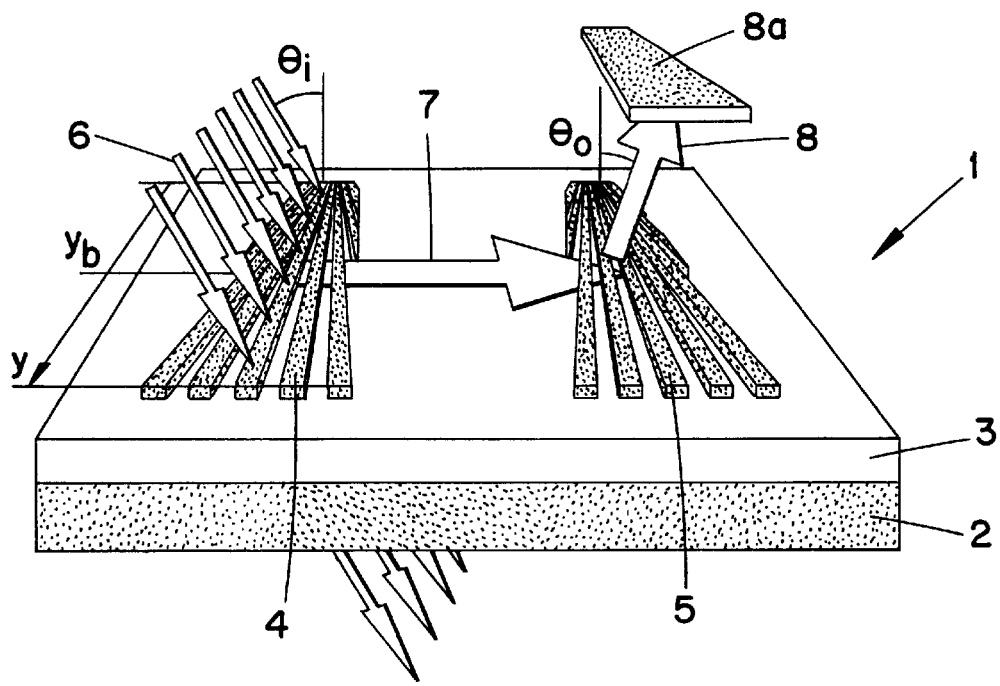
FIG. 1 schematically shows a device for executing the process in accordance with the invention.

A device 1 is represented in FIG. 1, which is particularly well suited for executing the process in accordance with the invention. The basic structure of the device 1 consists of a substrate 2, on which a thin film has been applied as a waveguide 3. In this case the substrate 2 has a refractive index $n_s$ at a thickness of $h_s$. The waveguide 3 has a refractive index $n_f$ at a thickness of $h_f$. Two grating fields 4 and 5 have been applied spaced apart from each other on the top of the waveguide 3. These two grating fields 4, 5 preferably have locally different resonance conditions, i.e. the distance of the individual grating elements is reduced or increased along the field depth. By means of this a periodicity Lambda (y) as a function of the field depth y is achieved. Furthermore, the refractive index $n_c$ of the adjacent layer above the grating fields is also known or defined.

A light beam 6, which enters the device 1 at an angle $\theta_i$, now acts on the device 1, i.e. the grating field 4 in particular. Now, if the light beam is a monochromatic light source, for example a laser beam, a lightwave 7 is generated by resonance excitation at a defined place $y_b$ in the waveguide 3, which is propagated inside the waveguide 3. If, for example, now the wavelength of the light beam 6 is changed, this lightwave 7 also wanders parallel along the axis y. At the place of the second grating field 5, the lightwave 7 generates an exit beam 8, which exits the waveguide 3 at a defined angle $\theta_o$. The latter can be determined, for example by detecting the impact point of the exit beam 8 on a detector 8a.

Only a very small portion of energy of the light beam 6 is required for the excitation and generation of the lightwave 7, because of which it is passed practically unchanged through the device 1.

In a polychromatic light beam a plurality of such lightwaves 7 is generated at appropriate wavelength-dependent positions. The superposition of these lightwaves 7 creates a spatial variation of the intensity of the exit beam 8 exiting at the grating field 5 from the waveguide 3. This intensity distribution is used as a measurement of the spectral composition of the light beam 6 impinging on the waveguide. The exit beam 8 can be conducted to a photoelectric detector 8a, for example, in order to detect this distribution and/or the position $y_b$ or the exit angle $\theta_o$.

Figure 2:
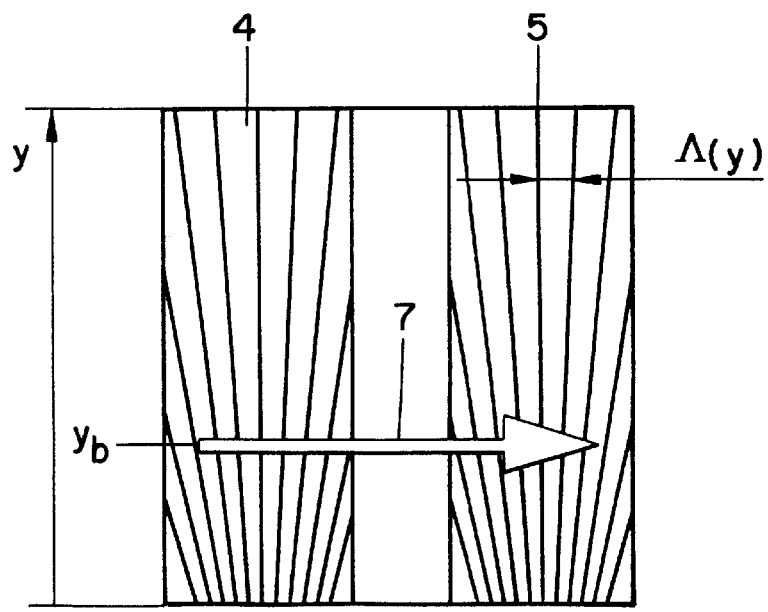
FIG. 2 is a top view of a waveguide in accordance with FIG. 1.

A top view on the device 1 in FIG. 1 is now represented in FIG. 2. Here, the two grating fields 4 and 5 have a linear grating variation. This means that the periodicity Lambda(y)

of the grating 4 changes linearly in relation to the axis y. A further advantage of the process in accordance with the invention lies in realizing non-linear characteristic lines simply by selecting a corresponding non-linear course Lambda(y) of the grating lines. It is possible by this to adapt the characteristics of the device optimally to the respective application. For example, it is possible in this way to combine areas of the greatest sensitivity with areas of the greatest dynamics. This is of particular interest for monitoring tasks wherein, for example, the wavelength lambda or the angle $\theta_i$ is intended to be exactly measured or regulated in a set area, but where dependable signals "much too high" or "much too low" are still received with larger deviations.

For the above represented process all important parameters are kept constant, except for the quantity to be measured. The refractive index $n_c$ of the adjacent area above the grating fields 4 and 5 in particular is maintained constant. This can be done, for example, by applying a transparent cover layer on top of these fields 4, 5.

If the light beam 6 impinges at a defined, fixed angle $\theta_i$ on the device 1, the photons at the position $y=y_b$ are coupled into the waveguide, where the local grating period Lambda $(y_b)$ meets the resonance conditions for coupling-in. This leads to a wavelength-dependent resonance periodicity of the grating field:

$$\Lambda = \Lambda(\lambda) = m_g \lambda / [N(\lambda) - n_c \sin \theta_i]$$

Here, $m_g$ identifies the diffraction order. For simplification it is possible to assume preferably a linear grating variation which, by employing a variation gradient glambda, results in the following formula:

$$\Lambda = \Lambda_0 + g_\Lambda \cdot y,$$

wherein here Lambda$_O$ is the periodicity at the position y=O. This now leads to the following characteristics of the process in accordance with the invention, or to the waveguide arrangement embodied in accordance with the invention:

$$y = y_b(\lambda) = [\Lambda(\lambda) - \Lambda_0]/g_\Lambda$$

The sensitivity for the wavelength determination of the waveguide arrangement is obtained by the derivation of this value:

$$y' \equiv \frac{dy}{d\lambda} = \left(\frac{dy}{d\Lambda}\right) * \left(\frac{d\Lambda}{d\lambda}\right) = \frac{\Lambda}{\lambda * g_\Lambda} * \left(1 - \frac{N' * \lambda}{m_g}\right),$$

wherein N' means the derivation dN/dlambda of the effective refractive number N.

As can be seen from the equations, a recalculation of the angle position is not necessary, because of which values, such as the effective focal distance, are not important in contrast to known spectrometer processes. The position $Y_b$ alone is a direct measurement for the quantity to be measured, preferably the wavelength or the angle of incidence of the light beam. As already represented, this position can be detected in the simplest manner, for example by means of photoelectric detectors, and subsequently evaluated.

It is clear that the resonance conditions can also be achieved by other than the local variation of the grating 4 or 5. For example, the thickness of the waveguide 3 or the refractive number $n_f$ of the waveguide and/or the adjoining media ($n_c/n_s$) can be locally varied in order to obtain locally varying resonance conditions analogously to the above described one. The achievement of chronologically varying resonance conditions is also conceivable. In this case it is possible, for example, to employ grating fields 4, 5 with parallel arranged grating lines, wherein for example, the refractive index $n_c$ of the adjacent area above the grating fields 4, 5 can be chronologically varied, for example by means of electromagnetic fields or temperature-controlled or -regulated liquid crystals.

For many applications a great advantage of the represented measuring process lies in that the light beam 6 can be passed practically unchanged through the device 1. The energy required for exciting the lightwave 7 can be kept so small in comparison with the total energy of the light beam 6, that this loss is of no consequence for practical applications. This now has the advantage that a measurement in accordance with the invention can be performed while the light beam is used, for example during the employment of a laser light beam for material processing or for writing purposes for data storage. With conventional measuring processes, in particular the conventional spectral analysis process, the entire light beam enters the spectrometer through a small opening and is practically destroyed during measurement and therefore cannot be used in other ways. The measurement of operating light beams in particular makes the represented process interesting for some practical applications.

Furthermore, all types of lenses or other light beam or focusing devices can be omitted, which as a rule are expensive on the one hand and on the other delicate to adjust.

Figure 3:
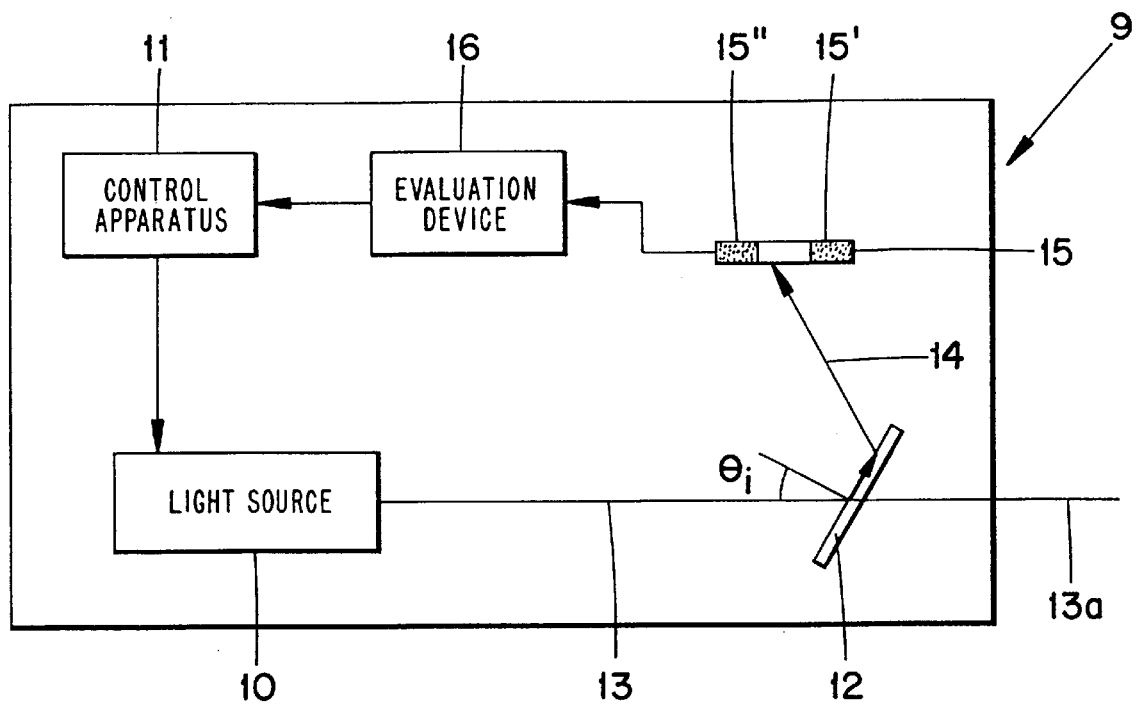
FIG. 3 is a diagram of a monochromatic light source regulated in accordance with the process of the invention.

In particular, it is preferably possible to create a simple measuring and regulating device for monochromatic laser light diodes with this. The structure of such a laser diode 9 in accordance with the invention is schematically represented in FIG. 3. Here the actual laser light source 10 is operated by a control apparatus 11. Laser light sources of this type have the property, among others, to change the wavelengths at different operating temperatures, wherein this change occurs discontinuously in part. If now a waveguide 12 constructed in accordance with the invention is positioned in front of the laser light source, a light indicator 14 is created in the waveguide, as previously described, with the appropriate setting of the refractive values of the waveguide arrangement 12 and the angle of incidence $\theta_i$ of the light beam 13. Furthermore, a photoelectric detector is disposed in such a way that this light indicator 14 is conducted on it. For example, this detector can now have two areas 15', 15", which are connected with a logical evaluation device 16. The latter in turn is connected with the control apparatus 11. When the laser source 10 is put into operation, the control can now be laid out in such a way that the light source 10 is continuously heated.

Figure 4:
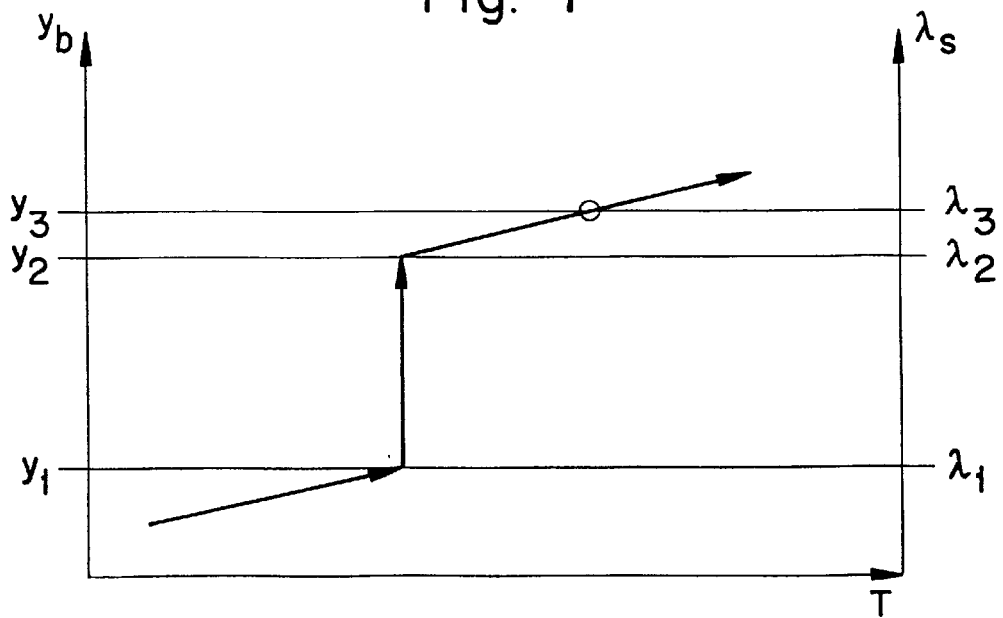
FIG. 4 shows qualitatively the characteristic of the indicator position of a laser diode as a function of the temperature and wavelength.

If now the light source 10 has, for example, the characteristic of temperature (T).wavelength (lambda$_s$), qualitatively represented in FIG. 4, the light indicator 14 will correspondingly move via the positions $y_1$ and $y_2$ to the set position $y_3$. The logical control device 11 can now advantageously be laid out so that upon reaching the position $y_3$ the heating is controlled in such a way, that the set position $y_3$ and therefore also the desired wavelength lambda$_3$ are maintained. In this way it can be prevented in particular that the diode is operated in the unstable range between lambda, and lambda$_2$. In this way the laser diode can be operated in a controlled manner within a defined wave range by simple means.

However, this measurement can also be merely employed for monitoring the status of a light source, for example, in order to indicate deviations from a set wavelength.

Depending on the application, especially with light beams of very small output, it can also be advantageous to increase the portion of the output coupled into the waveguide 3. In an extreme case practically the entire output of the light beam can be used for measuring. Although in that case the measurement is no longer free of destruction, it permits the measurement of very weak light beams. In this case the process in accordance with the invention permits the realization of extraordinarily small, compact spectrometer arrangements, which can also be produced cost-effectively, for example by means of replication in plastic substrates (SPIE, vol. 1992, Miniature and Micro-Optics and Micromechachanics (1993), "High-Precision Molding of Integrated Optical Structures").

If the entire output can be used for measuring, it is also possible to employ substrates which are not transparent, but instead offer other advantages. If a suitable material (for example a III–V-semiconductor) is used as substrate, all elements required for executing the process in accordance with the invention can be monolithically realized on it. This pertains in particular to the waveguide 3 and the coupling grating 4. A particularly advantageous variant is represented by way of example in FIG. 5. This consists in that the lightwave 7 is not decoupled from the waveguide 3, but instead it is measured directly by means of a detector 8a integrated into the waveguide 3. The decoupling grating 5 can therefore be omitted. It is furthermore also possible to integrate the electronic evaluation device AWE on the same substrate.

Figure 6:
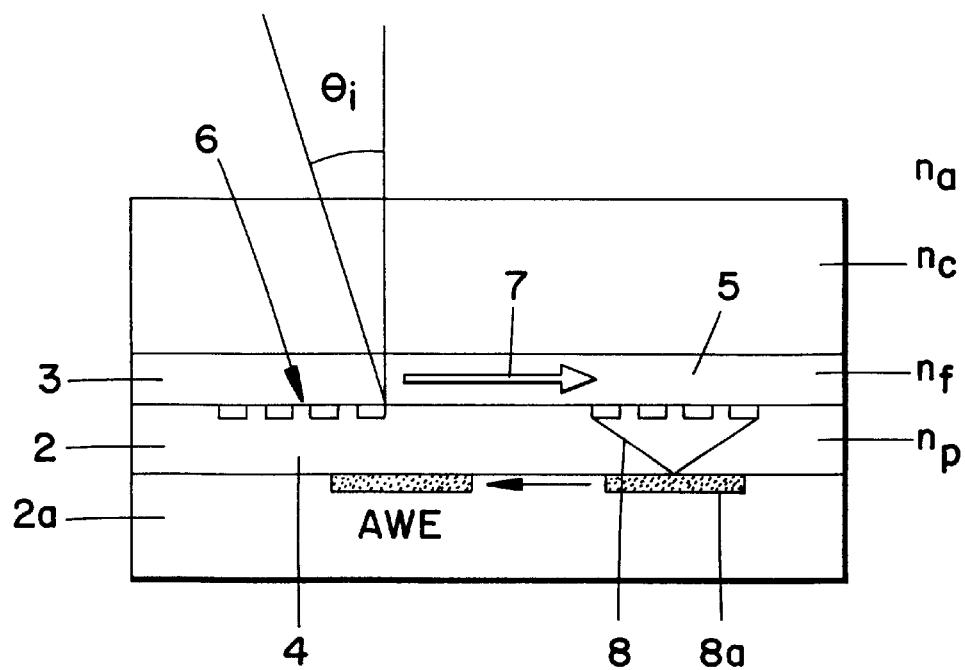
FIG. 6 is a cross section through a monolithic version, wherein the waveguide is connected by means of a buffer layer with the actual substrate.

A further monolithic version is represented in FIG. 6. Although it also employs a waveguide 3 with a coupling grating 4 and decoupling grating 5 as well as lightwaves 6, 7 and 8 as in the arrangement in accordance with FIG. 1, the substrate here is divided into two layers, namely an optically transparent buffer layer 2 and the actual substrate 2a. This has the advantage that the selection of substrate materials is increased, since they no longer need to be transparent.

A particularly advantageous arrangement can be realized in that a material (for example silicon) is selected for the substrate 2a, into which both the detector 8a and the electronic evaluation unit AWE can be integrated. Furthermore, a cover layer with a refractive index $n_c$ is shown in FIG. 6, which shields the waveguide 3 from interfering effects of the adjacent area and thus increases the strength and ruggedness of the device.

Suitable material combinations for the different layers are, for example:

Silicon, plastics for the "electronic" substrate 2a;

$SiO_2$ (for example thermally grown on 2a), plastics as optical buffer layer 2 ($n_p$);

Metal oxides, $Si_3N_4$, oxinitrides, plastics for the waveguide 3;

$SiO_2$, ormoceres, plastics for the cover layer ($N_c$);

Air, fluids, vacuum, plastics as the adjacent area ($n_a$).

In the represented examples, the process was used to determine the wavelength of a light beam 6. As pointed out at the outset, it is of course possible to measure other properties of the light beam 6. When using a light beam 6 of a known constant wavelength, such a waveguide can be employed for angle measuring, for example.

Figure 5:
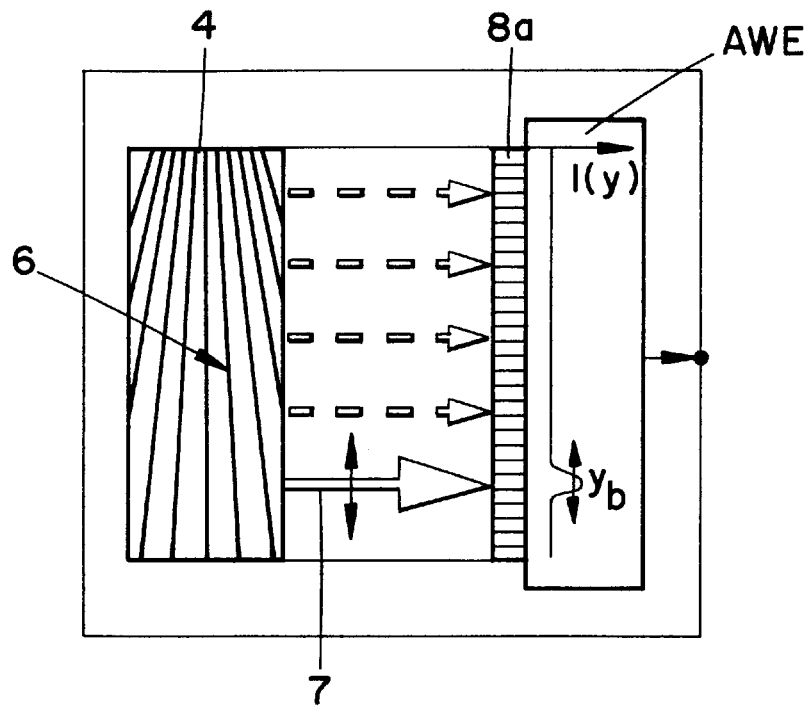
FIG. 5 shows a totally integrated version of a device for executing the process in accordance with the invention, wherein in place of a decoupling grating a detector directly in the waveguide and the associated evaluation unit are integrated on the same substrate.
Figure 7:
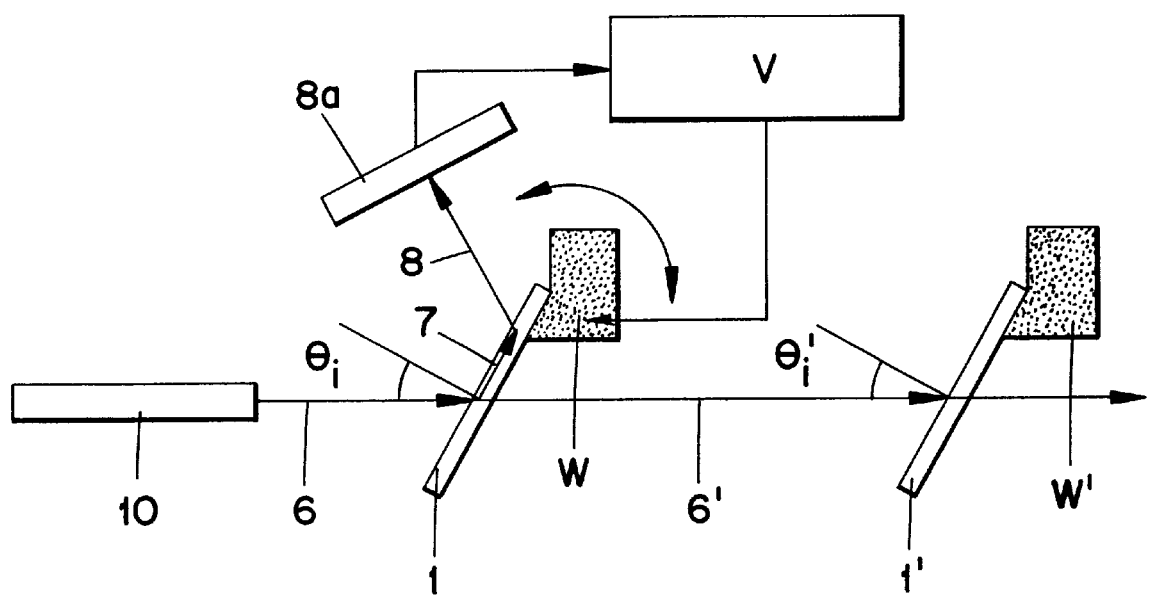
FIG. 7 is an application of the process in accordance with the invention for aligning a workpiece in relation with a laser beam.

FIG. 7 shows an example, where the possibility for angle measuring is used to align a workpiece W in relation to a laser beam. To this end, the device 1 in accordance with the invention is fastened on the workpiece W, and the device 1 is charged with the laser beam 6. The device 1 now functions as an angle sensor with an angle-dependent position of the exit beam 8, which, with the aid of the detector 8a, is converted into an electrical angle signal. For controlling the angle, the latter is now fed to a device V for setting the angle of the workpiece W. If only one workpiece W needs to be aligned, a measurement free of destruction is not necessary, and variants such as represented in FIGS. 5 and 6 can be employed. However, if a plurality of workpieces W, W' are to be aligned in relation to the same laser beam, this can be accomplished directly with the aid of the variants operating free of destruction without further aids by simple series switching (the beam transmitted through the device 1 is simultaneously the entry beam 6' for the device 1', which is fastened on the next workpiece W').

As mentioned at the outset, the process in accordance with the invention can also be realized with time-dependent resonance conditions. Two examples are cited in what follows, each of which has important advantages.

Figure 8A:
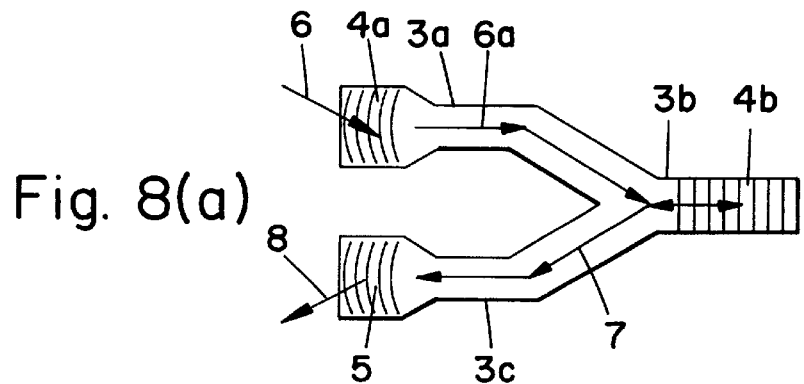
FIG. 8 is a spectrometer variant in which a tuneable Bragg filter is used for realizing the time-dependent resonance condition.
Figure 8B:
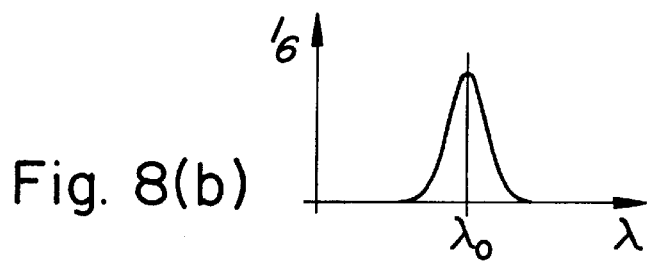
Figure 8C:
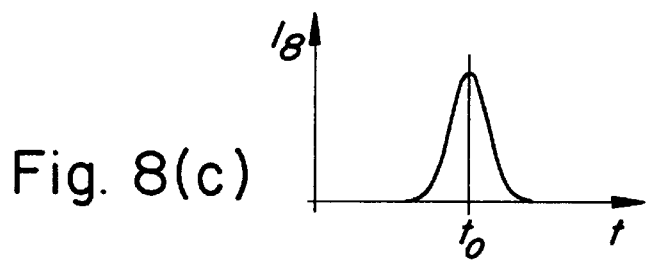

FIG. 8 shows a spectrometer variant with which a tuneable Bragg filter 4b is used to realize the time-dependent resonance condition. The spectrum $I_6$ Of the light beam 6 to be measured and the time-dependent intensity $I_8$ of the exit beam 8 are also represented. The mode of functioning can be summed up as follows: the function of the entry grating 4 (see FIG. 1) is realized here by means of two gratings 4a and 4b. The waveguide 3 is also divided, namely into three areas 3a, 3b and 3c (so-called strip waveguides). The light beam 6, or a portion thereof, to be measured is first coupled by the grating 4a into the strip waveguide 3a as the wave 6a. The latter impinges on a so-called "tuneable optical filter" 4b located in the waveguide section 3b. Such a filter can be realized as a Bragg grating, for example, and has a very sharp resonance condition for reflection, i.e. a reflected wave 7, which subsequently is transformed into the exit beam 8 by the grating 5, is created in only a very narrow wavelength range, which can be set by an electrical voltage or current, for example in the vicinity of the resonance wavelength lambda$_O$. In place of the local variation, the beam 8 has a chronological variation in its intensity $I_8$ (t), which corresponds to a chronological scanning of the spectrum $I_6$ of the beam 6 to be measured. An electrical signal can be obtained from this by means of a detector (not shown), which can be directly used for measuring or regulating the wavelength or the spectrum of the light beam 6. Various effects can be used for the chronological variation of the resonance condition, in particular those in which the reflective indices $n_f$, $n_c$, $n_s$ are varied individually or in combination, for example by means of electro-optical, magneto-optical, thermo-optical, non-linear-optical, acusto-optical influences.

Figure 10:
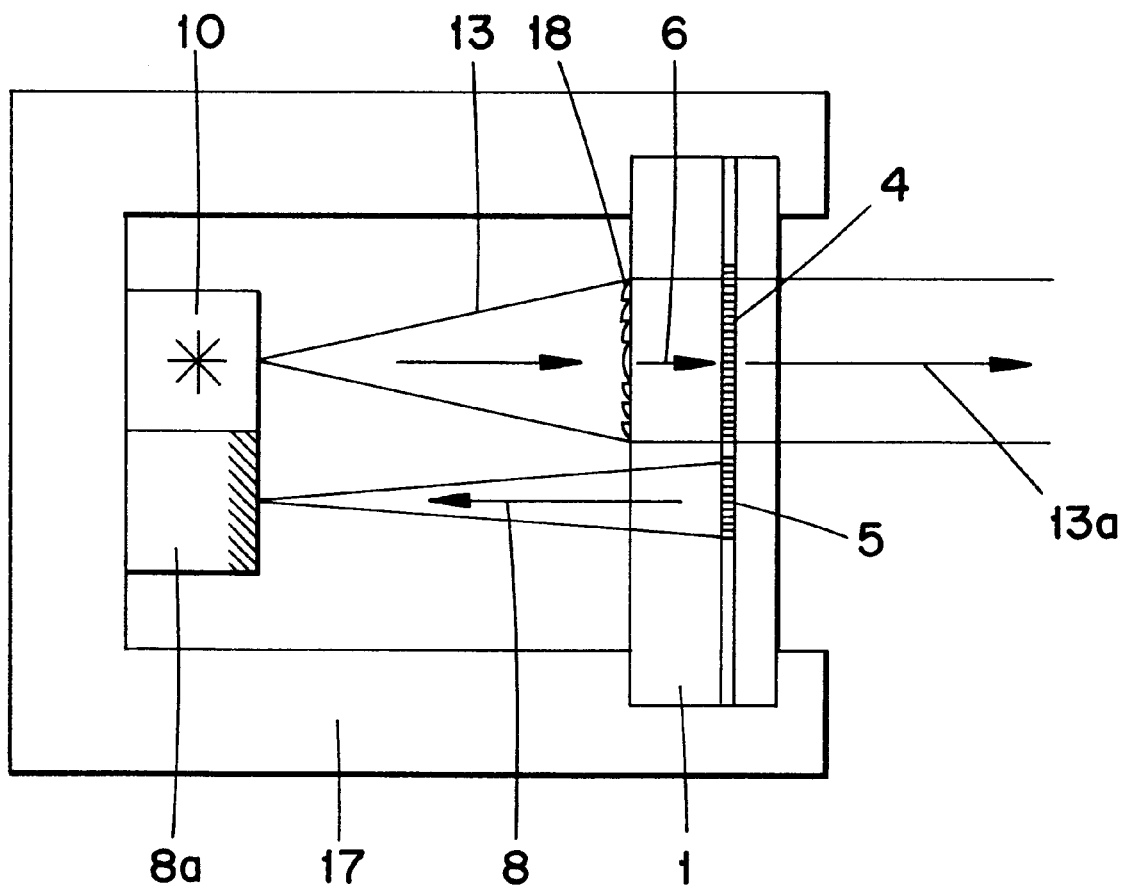
FIG. 10 is a compact light source regulated by means of the process in accordance with the invention.

FIG. 10 shows a particularly interesting arrangement for stabilizing or regulating the wavelength or the angle of a light beam 13 generated by a light source 10, wherein the device 1 in accordance with the invention is simultaneously used as a window of a hermetically sealed housing 17, which contains the light source 10, preferably a laser, and the detector 8a. Further components necessary for regulation can be inside or outside of the housing 17. Furthermore, an opportunity is offered to realize at least one optical component for beam conversion (for example collimation into a beam 13a) directly on the substrate (for example by microstructuring or appropriate shaping). Since commercially encapsulated light sources, in particular laser diodes, require a window anyway, it is therefore possible to create an ultra-compact controlled miniature light source which can be cost-effectively produced.

Figure 9:
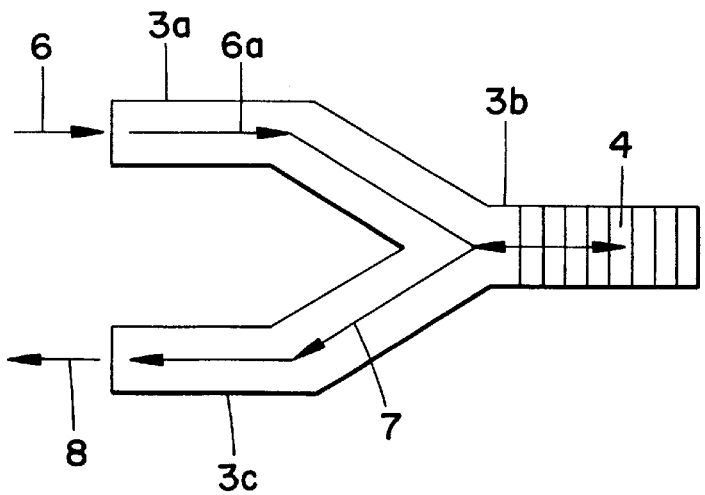
FIG. 9 is a version of the spectrometer in accordance with FIG. 7, in which the optical entries and exits are designed in such a way that light beams can be directly admitted or removed by means of optical fibers.

For certain applications it is of interest to supply the entry light beam 6 via optical fibers. This possibility is represented in FIG. 9. This option can be obtained from the spectrometer in accordance with FIG. 8 by designing the entries and exits in such a way that the light beams 6 and 8 can be supplied or removed directly by means of optical fibers. Known devices, by means of which fibers can be directly connected to the strip waveguides 3a or 3c, are then used in place of the grating couplers.

It is also possible to obtain further variants by using the resonance condition in transmission instead of reflection. All these arrangements, particularly the arrangements represented by way of example in the drawing figures, can also be realized by means of planar waveguides instead of strip waveguides.

The large advantage of the process in accordance with the invention and the waveguide embodied in accordance with the invention lies in the simple and cost-effective design, high resolution and the option of measuring without destruction, if the application requires this.

We claim:

1. A process for determining a property of an optical light beam, comprising:
   the light beam is impinged on a waveguide and locally and/or chronologically varying resonance conditions are created in the waveguide, wherein when resonance occurs a lightwave is generated in the waveguide, and this lightwave, or the position, phase or amplitude of this lightwave, are further processed as a directly measured quantity.

2. The process in accordance with claim 1, wherein the property of the light beam to be measured is the spectrum or the wavelength or the angle of impingement on the waveguide.

3. The process in accordance with claim 1, wherein the local variation of the resonance condition is achieved by providing locally different refractive indices and/or locally different thicknesses of the waveguide.

4. The process in accordance with claim 1, wherein the local variation of the resonance condition is achieved by a locally varying periodicity of a grating coupler.

5. The process in accordance with claim 1, wherein chronological variation of the resonance condition is achieved by a chronological variation of the waveguide properties.

6. The process in accordance with one of claim 1, wherein the lightwave is transmitted out of the waveguide by means of a grating coupler and is supplied to a detector.

7. The process in accordance with claim 6, wherein a grating coupler with locally varying periodicity is employed.

8. The process in accordance with claim 6, wherein a grating coupler with imaging properties is employed.

9. A waveguide for executing the process in accordance with claim 1, which is located on a substrate, wherein the waveguide has at least one diffraction grating of locally varying line distances on at least one side on its surface, and has on its surface facing away from the substrate an adjacent medium of a defined refractive index which is largely independent of adjacent influences.

10. The waveguide in accordance with claim 9, wherein two spatially separated areas with diffraction gratings are provided on the surface of the waveguide.

11. The waveguide in accordance with claim 9, wherein at least one decoupling and coupling grating is provided, wherein the decoupling grating is locally superimposed on the coupling grating.

12. The waveguide in accordance with one of claim 9, wherein the waveguide itself has evaluation components.

13. The waveguide in accordance with one of claim 9, wherein media with known optical properties are arranged on both sides of the waveguide.

14. The waveguide in accordance with claim 13, wherein the waveguide itself and/or at least one medium has optical properties which can be chronologically and/or spatially varied.

15. Application of the process in accordance with claim 1 for the control or regulation of the wavelength or the direction of light beams, wherein the lightwave is conducted onto a detector element which, corresponding to the impingement of the lightwave, transmits a signal to a control or regulating device which, corresponding to the signal, affects the generation of the light beam in such a way that the wavelength or the direction in respect to the angle of incidence of the light beam is increased or decreased or kept constant.

16. Application of the process in accordance with claim 1 for stabilizing the wavelength or the angle of a light beam generated by a light source, wherein a waveguide arrangement including the waveguide is disposed as the window of a housing through which the light beam exits from this housing.

17. Application in accordance with claim 16, wherein the waveguide arrangement itself is equipped with at least one beam-forming optical element.

18. The process in accordance with claim 1, wherein resonance in said waveguide does not directly optically affect operation of a light source which generates the light beam.

19. A process, comprising:
   directing a light beam on a waveguide, the waveguide having a surface defined by first and second perpendicular axes, prompting the generation of a lightwave in the waveguide at a defined place, the defined place being dependent upon a wavelength of the light beam;
   propagating the lightwave inside the waveguide;
   detecting the position of the lightwave; and
   determining a property of the light beam on the basis of the detected position.

20. The process according to claim 19, wherein the lightwave is generated at a defined place along the first axis, and the detecting detects the position of the lightwave along the first axis.

21. The process according to claim 19, wherein the light beam is polychromatic, and a plurality of lightwaves are generated at appropriate wavelength-dependent positions in along the first axis.

22. A device, comprising:
   a waveguide having a surface defined by first and second perpendicular axes;
   means for receiving a light beam and for generating a lightwave in the waveguide at a defined place, the defined place being dependent upon a wavelength of the light beam;
   a detector for detecting the position of the lightwave; and
   means for determining a property of the light beam on the basis of the detected position.

23. The device according to claim 22, wherein the light beam is polychromatic, and a plurality of lightwaves are generated at appropriate wavelength-dependent positions along the first axis.

24. The device according to claim 22, wherein the lightwave is generated at a defined place along the first axis, and the detector detects the position of the lightwave along the first axis.

25. The device according to claim 22, wherein the means for receiving and generating comprises a grating field formed on the waveguide, the grating field including plural grating elements, wherein the spacing between the grating elements varies in the direction of the first axis.

26. A process, comprising:

directing a light beam on a waveguide;

modifying the light beam in an optical filter having defined resonance properties;

detecting the light beam after it has been modified by the optical filter;

changing the resonance properties of the optical filter;

detecting the light beam after it has been modified by the optical filter having changed resonance properties; and determining a property of the light beam on the basis of results of the detecting steps.

* * * * *